(12) United States Patent
Rammhofer et al.

(10) Patent No.: US 6,434,935 B1
(45) Date of Patent: Aug. 20, 2002

(54) LIQUID RESERVOIR

(75) Inventors: Thomas Rammhofer, Sasbach; Jan Grabenstätter, Gernsbach, both of (DE)

(73) Assignee: LuK Lamellen und Kupplungsbau Beteiligougs KG, Bühl (DE)

( * ) Notice: Subject to any disclaimer, the term of this patent is extended or adjusted under 35 U.S.C. 154(b) by 0 days.

(21) Appl. No.: 09/639,280

(22) Filed: Aug. 15, 2000

(30) Foreign Application Priority Data

Aug. 16, 1999 (DE) .......................... 199 38 803

(51) Int. Cl.$^7$ .................................. B60T 11/30
(52) U.S. Cl. ............................ 60/585; 60/592
(58) Field of Search .................. 60/585, 592, 588, 60/583

(56) References Cited

U.S. PATENT DOCUMENTS 3,359,730 A * 12/1967 Schanz .................. 60/588
3,423,939 A * 1/1969 Lewis et al. .............. 60/588
4,407,125 A * 10/1983 Parsons .................. 60/584

FOREIGN PATENT DOCUMENTS

DE    39 18 457 A 1    12/1989
DE    42 01 565 A 1    7/1993

* cited by examiner

*Primary Examiner*—Kevin Lee
(74) *Attorney, Agent, or Firm*—Alfred J. Mangels

(57) ABSTRACT

A liquid reservoir, particularly for use in an hydraulic system. The reservoir includes a container and a cover cap, and it is intended for containing an hydraulic pressure medium. A pressure equalization component is provided within the container for compensating for pressure differences between the interior of the container and the surrounding atmosphere, and a level compensation component is provided for compensating for changes in the volume of the pressure medium. The pressure equalization component is functionally separate from the level compensation component.

20 Claims, 1 Drawing Sheet

LIQUID RESERVOIR

BACKGROUND OF THE INVENTION

1. Field of the Invention

The present invention relates to a liquid reservoir, and more particularly to a liquid reservoir for a pressure medium in an hydraulic system and that includes means for compensating between atmospheric pressure and the pressure within the liquid reservoir, as well as means for compensating for changes in volume of the pressure medium.

2. Description of the Related Art

Liquid reservoirs of the type known in the art are installed in motor vehicle hydraulic systems, especially as equalizing reservoirs in, for example, braking and clutch systems. In such systems wear of the friction linings and losses of pressure medium, as well as thermal expansion coefficients of the components and of the pressure medium, cause level fluctuations of the pressure medium in the liquid reservoir. To avoid a partial vacuum in the hydraulic system, the reservoir or its sealing cover includes an opening so that the liquid reservoir is at pressure equilibrium with the atmosphere. To protect the liquid reservoir against penetration by dirt and/or water, the opening of the liquid reservoir to the atmosphere is arranged in labyrinthine form, and/or as shown, for example, in German Patent Publication DE 39 18 457 A1, a substantially gas-impermeable, elastomeric membrane, or an expansion bellows, can be installed, which because of mechanical deformability can adapt to the level of the pressure medium and avoid a partial vacuum.

Such arrangements having an opening have a drawback in that despite the labyrinth, the opening can become clogged or can allow a comparatively high. entry of dirt or water, and a closed liquid reservoir with a gas-impermeable membrane or an expansion bellows offers no possibility to lead off the pockets of outside air that are formed, for example, by leakage into the hydraulic system.

Accordingly, in German Patent Publication DE 42 01 565 A1 there is proposed a liquid reservoir that is sealed from the atmosphere by a gas-permeable but substantially liquid-impermeable membrane, for example a PTFE membrane. However, it was found, nevertheless, that in the presence of pressure fluctuations in the pressure medium, such a membrane gets wetted very rapidly, and thereby the pressure medium saturates the membrane, restricting the diffusion of gas and encouraging the escape of pressure medium.

It is therefore an object of the present invention to provide a liquid reservoir that allows gas or air diffusion when there are pressure fluctuations in the liquid reservoir, and that will avoid the development of a partial vacuum within the liquid reservoir. Moreover, the liquid reservoir should be economically constructed with few components and with long-term stability, that is, low maintenance.

SUMMARY OF THE INVENTION

The problem is solved by providing a liquid reservoir which, particularly for a pressure medium for an hydraulic system, includes a means for pressure equalization between atmospheric pressure and the reservoir pressure, as well as a means for compensating for changes in the volume of the pressure medium, whereby both means are functionally separate from each other.

In the conception of the invention, the problem is further solved by a liquid reservoir, especially for a pressure medium of an hydraulic system, that provides a means for compensating for changes in the volume of the pressure medium, and that provides an opening that is substantially gas-permeable and liquid-tight, whereby the opening provides pressure relief.

Moreover, the problem can be solved by providing in a liquid reservoir a pressure equalizing means, the gas-permeable opening of which is connected in parallel. For example, a pressure equalizing means, such as a gas-tight membrane made of an elastomer or of rubber, or in the form of a bellows made from an elastomer, rubber, or the like, can be used to compensate for level changes of the pressure medium, wherein the pressure equalizing means seals the liquid reservoir from the atmosphere in a gas-tight and a liquid-tight manner. The pressure equalizing means can be mounted in a known manner between the liquid reservoir and the cover, or at another position, whereby, especially for the purpose of preventing soiling of the liquid reservoir, the pressure equalization means can be accommodated substantially within the liquid reservoir, and can communicate with the outside atmosphere through an opening of labyrinthine design.

As the means for providing a gas-permeable opening between the interior of the reservoir and the atmosphere, that is, inside the pressure equalizing means for the pressure medium in the pressure chamber, a gas-permeable membrane, for example a PTFE membrane, can be provided, that, for reasons of stability or better adhesion to a component of the liquid reservoir, can be deposited on a base material that can be, for example, plastic or wire mesh. The opening that is closed by a membrane can be arranged on a convenient component of the liquid reservoir, but the arrangement of the opening with the membrane near the cover produces advantages, for example, contact with the pressure medium can be minimized and the risk of wetting the membrane with the pressure medium from the inside can thereby be minimized. It is especially advantageous to arrange the membrane on the pressure equalizing means. Thus, in an advantageous embodiment, the membrane can be arranged directly on the pressure side of a bellows that faces the pressure medium, whereby the bellows includes an opening in that area, which opening is sealed in a substantially liquid-tight manner by the gas-permeable membrane.

The membrane is securely joined to the component of the liquid reservoir. Known connection methods for connecting two plastics can be used advantageously, for example adhesives, cold welding, vulcanization, welding, pressing, bonding, and/or extrusion. Furthermore, a difficult-to-connect membrane can advantageously be connected with the component in a layered form (sandwich arrangement), whereby the membrane is embedded between two readily-connectable materials. Additionally, the membrane also can advantageously be affixed to a mesh that is readily connectable to the liquid reservoir.

A further advantageous arrangement involves the application of a membrane that has elastic qualities and that is at least partially permeable, either over the entire face or concentrated in a suitable portion, while being substantially liquid-tight. Suitable membranes can be, for example, porous silicon membranes the gas permeability of which is substantially higher than that of conventional elastomeric membranes such as, for example, rubber membranes, or conventional gas-tight elastomeric membranes, which by means of a suitable process exhibit micropores that are so small that wetting of the membrane by the pressure medium and possibly by outside water is substantially impossible.

A further advantageous form of the inventive concept is an arrangement that includes a level compensating device and a gas passageway in the form of a gap that can be closed as a function of the interior pressure of the liquid reservoir, for example. A gap can advantageously be formed in the liquid reservoir when the level compensating device, such as, for example, a bellows, is in its limit position as a result of a high pressure medium level, and an air pocket is formed in the liquid reservoir. The gap therefore advantageously opens at a pressure that is not detrimental to the hydraulic system as a back pressure, for example less than 700 mbar, preferably less than 450 mbar, and in special cases less than 250 mbar.

An advantageous form can therefore be a liquid reservoir, especially for an hydraulic pressure medium, that has at least a pressure-medium-receiving reservoir with a connection for a pressure-medium conduit, whereby a wall can be provided in an elastomeric membrane or in a bellows that communicates with the atmosphere and that physically separates the pressure medium from the atmosphere, and an air-tight contact is formed between the bellows wall and a substantially inelastic body, which opens automatically when there is a pressure differential between the reservoir and the side exposed to the atmosphere.

In that connection, the substantially inelastic body can be formed by a piston-like component which, by means of contact of its outside surface with the wall of a ring-shaped opening tightly seals the bellows, whereby in the component's casing surface an opening is provided that extends through the wall. The elastic bellows wall is distended as a result. of pressure from the interior chamber, and a gap is formed between the piston-like component and the wall, allowing the accumulated gas, substantially air, for instance, to escape. The piston-like component is advantageously affixed in the aperture of the pressure equalizing means, such as the bellows, for example, its inner region can be enlarged radially relative to the radius of the opening in the bellows to prevent shifting of the component toward the outside.

The inventive concept provides an advantageous hydraulic system, in particular for brake and/or clutch apparatus in a motor vehicle, with a master cylinder that is connected by a hydraulic line with a slave cylinder which, in turn, serves at least one brake or at least one clutch. The hydraulic force is transmitted by the pressure medium that fills the line, and any excess or lack of pressure medium is either received into or removed from the liquid reservoir, preferably in the unloaded state of the hydraulic system, and is stored in the reservoir. Thereby, an hydraulic system can be provided that can offer high security against leakage of the pressure medium from the liquid reservoir, and permit operation of the system at negligible back pressure and/or without partial vacuum. Evacuation of generated gas, that is air bubbles, can thereby prevent foaming of the pressure medium and the introduction of air into the hydraulic line, especially from a large air pocket in the liquid reservoir and/or from pressure medium foaming. Such a design, furthermore, enables reliable and/or economical system operation, particularly if the clutch apparatus is operated automatically, where it can be necessary to accommodate the liquid reservoir in the vicinity of the engine or of the transmission, with resulting difficult operating conditions (temperature, changing hydrostatic system conditions). Furthermore, it can also be necessary, to optimize the control system in such a way that the tolerances to back pressure in the clutch disengagement apparatus must be reduced, whereby an electronic clutch management system or an automatic transmission with a corresponding electronic clutch management system can advantageously be equipped with an hydraulic system in accordance with the invention for a disengaging system of such a clutch.

BRIEF DESCRIPTION OF THE DRAWINGS

The invention is further explained below in relation to the following drawings in which.

DESCRIPTION OF THE PREFERRED EMBODIMENTS

Figure 1:
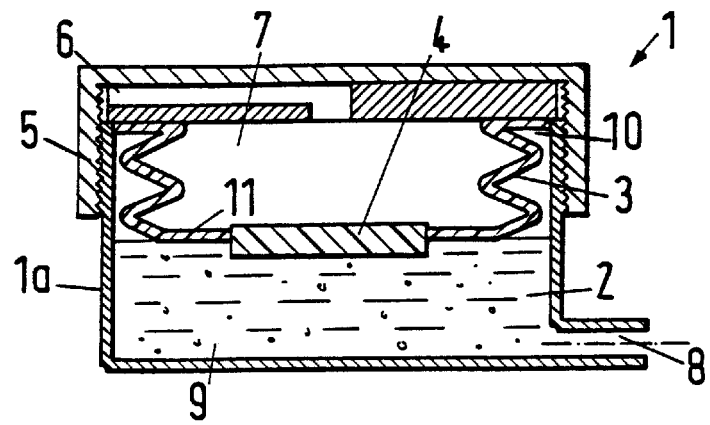
FIG. 1 shows a cross-sectional, elevational view of an illustrative embodiment of a liquid reservoir in accordance with the present invention and including a bellows and a gas-permeable membrane.

FIG. 1 schematically shows a liquid reservoir 1 with a reservoir housing 1a that is sealed by a cover 5, whereby the cover includes a labyrinthine opening 6 that serves as a connection between a first interior chamber 7 and the atmosphere, that is, the environment at atmospheric pressure.

Pressure medium 2 is contained in reservoir 1, which supplies an hydraulic system (not shown) with pressure medium 2 through conduit 8, and which receives excess pressure medium 2, as well as, should the occasion arise, gas or air bubbles that appear through gas evolution as a result of pressure and/or temperature variations, or leakage into the system—s lines.

Bellows 3 is provided in this embodiment to compensate for level changes in pressure medium 2, in which the volume of second interior chamber 9 changes relative to that of first interior chamber 7. If the volume in chamber 9 increases, bellows 3 is compressed, and if the volume in chamber 9 decreases the bellows unfolds. The volume of pressure medium 2 and that of the liquid reservoir can be so balanced that even at maximum consumption no air enters conduit 8, so that a replenishment of pressure medium can largely be omitted. Moreover, it is especially advantageous to fill reservoir 1 only to the maximum compression of bellows 3.

In the illustrated embodiment, gas-permeable membrane 4 is received on the pressure side or front side 11 of bellows 3 and is sealed thereto, for example by welding, pressing, or cementing. If in the course of operation an air pocket 10 builds up inside chamber 9 of reservoir 1, it is pushed through membrane 4, which is composed of PTFE (polytetrafluoroethylene), or other gas-permeable materials, and that can be received on a support mesh, until pressure medium 2 again touches membrane 4, which is impermeable to pressure medium 2 up to a given pressure. If the pressure rises further bellows 3 will deform, and unlike with the prior art, membrane 4 will not allow pressure medium to be forced therethrough, which in that instance would render it ineffective.

Of course, FIG. 1 only shows liquid reservoir 1 schematically, and the arrangements of the individual components relative to each other are represented in partially simplified form, for example, the optimization of the seal of bellows 3 with the housing, its distance from reservoir housing 1a, the attachment of conduit 8 to reservoir housing 1a, which can be by a quick-connect that advantageously is self-locking.

Figure 2:
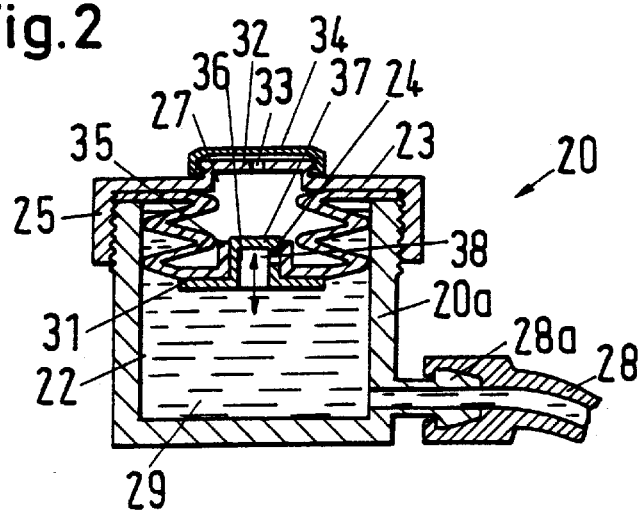
FIG. 2 shows a cross-sectional, elevational view of another illustrative embodiment of a liquid reservoir in accordance with the present invention and including a bellows and a closable gap.

FIG. 2 schematically shows an embodiment of a liquid reservoir 20 similar to that of reservoir I of FIG. 1, which, as an alternative to membrane 4 of FIG. 1, includes a closable gap 24 as the gas-permeable opening.

Reservoir housing 20a includes a connection 28a for attaching interconnecting feed conduit 28 of the hydraulic system (not shown), and is closed by a cover 25, whereby bellows 23 is effective between and is sealed between cover 25 and reservoir housing 20a. Cover 25 includes an extension 32 with an opening 33 for providing communication between first interior chamber 27 of liquid reservoir 20 and the surroundings. Opening 33 is protected against water spray and dirt by an air-permeable cover 34 that is securely attached to extension 32 by a locking connection.

Bellows 23 includes in the vicinity of its front face 31 a ring-shaped opening 36 formed by an axially-extending wall 35, in which is inserted a piston, that is a hollow cylindrical valve member 37 that is closed at one end, the valve member including an aperture 38 extending through its cylindrical surface and that is closed by wall 35, wherein the valve member is grippingly retained by elastic bellows 32.

As described already in relation to FIG. 1, fluctuations in the liquid level of pressure medium 22 are compensated along the direction of the arrow by bellows 23, in the course of which aperture 38 remains closed.

Figure 3:
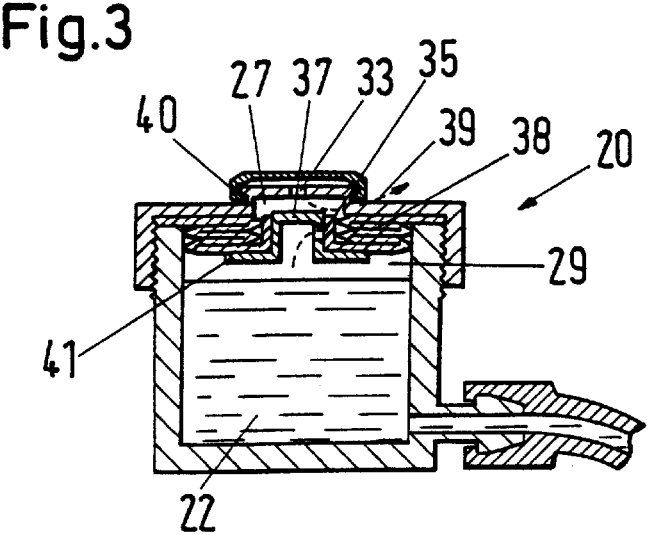
FIG. 3 shows the embodiment of FIG. 2 with an air pocket present within the reservoir.

FIG. 3 shows the same liquid reservoir 20 after the occurrence of an air pocket within interior space 29 of the volumetric region of pressure medium 22. After exceeding a still-tolerable pressure, that is established against the seal between wall 35 and aperture 38, and that is less than 750 mbar, preferably less than 500 mbar, and especially less than 250 mbar, wall 35 is lifted off aperture 38 and the air escapes through aperture 38, along the path shown in dashed lines, across first interior chamber 27, through aperture 33 and form-locking connection 40, for example a screw thread or a bayonet catch, to the outside. To avoid axial shifting in the direction of the pressure, valve member 37 is provided with a radially-enlarged shoulder 41 that extends outwardly beyond the radius of wall 35.

It will be clear from FIG. 3 that for all the applicable embodiments of liquid reservoirs (for example also reservoir 1 of FIG. 1), bellows 3, 23 can be compressed to its limit stop before air escapes. Such a feature however is not foundational, rather the flow resistance of the gas-permeable openings, for example membrane 4 in FIG. 1 and closable gap 24 in FIG. 2, and the level compensation, for instance bellows 3, 23 (FIGS. 1, 2), can be construed as two flow resistances that are in parallel or in series, whereby in the case of a parallel arrangement the level can be adjusted simultaneously with a reduction in the air pocket, and in the case of a series arrangement, level adjustment takes place first, and thereafter the air pocket is reduced. The coordination of level compensation with the opening resistance of the gap, or, for example, to the "bubble points" of the membrane, that is, the flow resistance to air or gas through the membrane, is controlling for the different operating methods.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate, and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A liquid reservoir, in particular for an hydraulic system that includes a pressure medium, said reservoir comprising:
   a. a container for receiving and containing a fluid pressure medium;
   b. means for compensating for a pressure difference between atmospheric pressure and a pressure of the pressure medium within the container, said means including gas-permeable means for allowing gas to pass therethrough and that is substantially liquid-impermeable; and
   c. means including a bellows within the container for compensating for changes in volume of the pressure medium within the container, wherein the means for compensating for a pressure difference is carried by the bellows and is functionally separate from the means for compensating for changes in volume.

2. A liquid reservoir in accordance with claim 1, wherein the means for compensating for a pressure difference is in parallel to the opening means.

3. A liquid reservoir in accordance with claim 1, wherein the means for compensating for a pressure difference is in series with the opening means.

4. A liquid reservoir in accordance with claim 1, wherein the opening means is a gas-permeable membrane.

5. A liquid reservoir in accordance with claim 1, wherein the opening means is a closable gap.

6. A liquid reservoir in accordance with claim 5, wherein the gap is closed as a function of the pressure within the liquid reservoir between the means for compensating for a pressure difference and a blocking member.

7. A liquid reservoir in accordance with claim 6, wherein the blocking member is mounted in an opening formed in the bellows.

8. A liquid reservoir in accordance with claim 4, wherein the membrane is securely connected to the bellows.

9. A liquid reservoir in accordance with claim 8, wherein the membrane connection with the bellows is selected from the group consisting of vulcanization, welding, cold-pressing, bonding, and extrusion.

10. A liquid reservoir in accordance with claim 1, wherein the bellows includes an outer end wall that is sealingly received between the container and a container cover.

11. A liquid reservoir in accordance with claim 10, wherein the cover includes a labyrinthine opening that extends between the interior of the container and the surrounding atmosphere.

12. A liquid reservoir in accordance with claim 1, wherein the hydraulic system is a motor-vehicle brake system that includes a master cylinder, a slave cylinder connected through a hydraulic line to the master cylinder and for loading a brake, and a pressure medium within the hydraulic system for transmitting force hydraulically.

13. A liquid reservoir in accordance with claim 1, wherein the hydraulic system is a motor-vehicle clutch system that includes a master cylinder, a slave cylinder connected through a hydraulic line to the master cylinder and for loading a clutch, and a pressure medium within the hydraulic system for transmitting force hydraulically.

14. A liquid reservoir, in particular for an hydraulic system that includes a pressure medium, said reservoir comprising:

a. a container for receiving and containing a fluid pressure medium, wherein the container includes an outlet connection for receiving a pressure-medium conduit;

b. means for compensating for changes in volume of the pressure medium within the container, including a flexible bellows within the container for communicating with the atmosphere and for physically separating the pressure medium from the atmosphere, wherein the bellows includes a wall that defines a receptacle; and c. means for compensating for a pressure difference between atmospheric pressure and a pressure of the pressure medium within the container, including a substantially inelastic body carried in the receptacle to provide an air-tight seal therebetween, wherein the wall is elastic to provide a passageway between the wall and the inelastic body when there is a pressure differential between the reservoir side and the atmosphere side of the bellows, wherein the means for compensating for a pressure difference is functionally separate from the means for compensating for changes in volume.

15. A liquid reservoir in accordance with claim 14, wherein the substantially inelastic body includes an aperture opposite to the wall to allow air to escape from the container when the pressure of air within the container reaches a predetermined level.

16. A liquid reservoir in accordance with claim 14, wherein the substantially inelastic body includes stop means for retaining the body against movement along the wall.

17. A liquid reservoir in accordance with claim 15, wherein the substantially inelastic body includes a closed-ended tubular portion that extends into the bellows, and the aperture is provided in the tubular portion.

18. A liquid reservoir in accordance with claim 14, wherein the bellows includes an outer end wall that is sealingly received between the container and a container cover.

19. A liquid reservoir in accordance with claim 14, wherein the hydraulic system is a motor-vehicle brake system that includes a master cylinder, a slave cylinder connected through a hydraulic line to the master cylinder and for loading a brake, and a pressure medium within the hydraulic system for transmitting force hydraulically.

20. A liquid reservoir in accordance with claim 14, wherein the hydraulic system is a motor-vehicle clutch system that includes a master cylinder, a slave cylinder connected through a hydraulic line to the master cylinder and for loading a clutch, and a pressure medium within the hydraulic system for transmitting force hydraulically.

* * * * *